United States Patent [19]

Parrott et al.

[11] Patent Number: 4,687,757

[45] Date of Patent: Aug. 18, 1987

[54] HYDROFINING CATALYST COMPOSITION AND PROCESS FOR ITS PREPARATION

[75] Inventors: Stephen L. Parrott; Simon G. Kukes; Karlheinz K. Brandes, all of Bartlesville, Okla.

[73] Assignee: Phillips Petroleum Company, Bartlesville, Okla.

[21] Appl. No.: 843,489

[22] Filed: Mar. 24, 1986

[51] Int. Cl.$^4$ .................. B01J 21/04; B01J 21/06; B01J 23/28; B01J 27/051

[52] U.S. Cl. ........................... 502/220; 502/309

[58] Field of Search ............ 502/220, 309, 219, 308, 502/351

[56] References Cited

U.S. PATENT DOCUMENTS

| | | | |
|---|---|---|---|
| 3,205,165 | 9/1965 | Hilfman | 208/254 |
| 3,280,040 | 10/1966 | Jaffe | 252/439 |
| 3,401,125 | 9/1968 | Jaffe | 252/439 |
| 3,502,595 | 3/1970 | Johnson et al. | 252/437 |
| 3,523,912 | 8/1970 | Jaffe | 252/439 |
| 3,546,105 | 12/1970 | Jaffe | 208/216 |
| 3,840,473 | 10/1974 | Beuther et al. | 252/439 |
| 3,936,505 | 2/1976 | Oda et al. | 502/309 X |
| 3,964,995 | 6/1976 | Wolk et al. | 208/210 |
| 3,968,027 | 7/1976 | Frayer et al. | 208/210 |
| 4,018,714 | 4/1977 | Wilson et al. | 252/465 |
| 4,115,248 | 9/1978 | Mulaskey | 208/112 |
| 4,128,505 | 12/1978 | Mikovsky et al. | 252/465 |
| 4,133,777 | 1/1979 | Frayer et al. | 502/308 X |
| 4,186,080 | 1/1980 | Mikovsky et al. | 208/143 |
| 4,196,101 | 4/1980 | Wilson et al. | 502/219 X |
| 4,206,036 | 6/1980 | Takeuchi et al. | 502/309 X |
| 4,422,960 | 12/1983 | Shiroto et al. | 502/206 |
| 4,440,631 | 4/1984 | Togari et al. | 208/112 |
| 4,465,790 | 8/1984 | Quayle | 502/309 |

FOREIGN PATENT DOCUMENTS 53-25290 3/1978 Japan .................................. 502/309

*Primary Examiner*—W. J. Shine
*Attorney, Agent, or Firm*—K. K. Brandes

[57] ABSTRACT

A composition of matter comprising alumina, at least one compound of titanium and at least one compound of molybdenum is prepared either by the steps of impregnating an alumina support material with an aqueous solution of at least one titanium compound, drying, impregnating the Ti-impregnated material with an aqueous solution of at least one molybdenum compound, drying and calcining; or by the steps of impregnating an alumina support material with an aqueous solution of at least one titanium compound and at least one molybdenum compound, drying and calcining. The compositions of matter of this invention are useful as catalysts for hydrotreating substantially liquid hydrocarbon-containing feed streams (particularly heavy oils) which also contain compounds of nickel, vanadium and sulfur.

50 Claims, No Drawings

HYDROFINING CATALYST COMPOSITION AND PROCESS FOR ITS PREPARATION

BACKGROUND OF THE INVENTION

This invention relates to catalytic hydrotreating of liquid hydrocarbon containing feed stream, in particular heavy petroleum fractions.

The use of alumina, promoted with transition metal compounds, for hydrotreating (e.g., demetallizing, desulfurizing, denitrogenating, hydrocracking) liquid hydrocarbon feed streams, which contain metal, sulfur and nitrogen impurities, is well known. However, there is an ever present need to develop new catalysts that are less expensive and/or more effective in removing these impurities from such feed streams than those presently employed. The removal of these impurities is desirable because they can poison catalysts in downstream operations such as catalytic cracking and can cause pollution problems when hydrocarbon products from these feed streams are used as fuels in combustion processes.

SUMMARY OF THE INVENTION

It is an object of this invention to provide an effective hydrofining catalyst composition. It is another object of this invention to provide a process for preparing a new, effective hydrofining catalyst composition. It is a still further object of this invention to employ a new catalyst composition for the removal of sulfur, nickel, vanadium and other impurities from hydrocarbon-containing oils. Other objects and advantages will be apparent from the detailed description and the appended claims.

In accordance with this invention, there is provided a composition of matter (suitable as a catalyst composition) comprising (preferably consisting essentially of) alumina, at least one compound of titanium and at least one compound of molybdenum, wherein said composition of matter is prepared by a process comprising the steps of:

(A) impregnating a support material consisting essentially of alumina with a solution comprising (preferably consisting essentially of) water and at least one compound of titanium;

(B) heating the material obtained in step (A) under such conditions as to at least partially dry said material;

(C) impregnating the substantially dried material obtained in step (B) with a solution comprising (preferably consisting essentially of) water and at least one compound of molybdenum;

(D) heating the material obtained in step (C) at a first temperature so as to at least partially dry said material obtained in step (C);

(E) heating (i.e., calcining) the at least partially dried material obtained in step (D) at a second temperature, which is higher than said first temperature, so as to activate said at least partially dried material.

A substantially liquid hydrocarbon-containing feed stream, which also contains compounds of nickel, vanadium and sulfur as impurities, is simultaneously contacted with a free hydrogen-containing gas and the composition of mater prepared by the process comprising steps (A) through (E), under such hydrotreating conditions as to produce a hydrocarbon-containing stream having a reduced level of at least one of nickel, vanadium and sulfur.

Also in accordance with this invention, there is provided a composition of matter (suitable as a catalyst composition) comprising (preferably consisting essentially of) alumina, at least one compound of titanium and at least one compound of molybdenum, wherein said composition of matter is prepared by a process comprising the steps of:

(I) impregnating a support material consisting essentially of alumina with an aqueous solution comprising (preferably consisting essentialy of) at least one compound of titanium and at least one compound of molybdenum;

(II) heating the material obtained in step (I) at a first temperature so as to at least partially dry said material obtained in step (I); and (III) heating (i.e., calcining) the at least partially dried material obtained in step (II) at a second temperature, which is higher than said first temperature, so as to activate said at least partially dried material.

A substantially liquid hydrocarbon-containing feed stream, which also contains compounds of nickel, vanadium and sulfur as impurities, is simultaneously contacted with a free hydrogen-containing gas and the composition of matter prepared by the process comprising steps (I) through (III), under such conditions as to produce a product stream having a reduced level of at least one of nickel, vanadium and sulfur.

DETAILED DESCRIPTION OF THE INVENTION

The alumina support material used in the preparation of the catalyst composition of this invention can be substantially pure alumina or partially hydrated forms thereof. Generally the surface area (determined by BET/$N_2$; ASTM D3037) of said support material ranges from about 20 to about 350 $m^2/g$. The support material may contain transition metals such as those of Groups IB, VB, VIB, VIIB and VIII of the Periodic Table (as defined by "College Chemistry", by W. H. Nebergall et al, 4th Edition, D. C. Heath and Co., 1972), e.g., Mo or Ni or compounds thereof. At present, it is not preferred to have more than only traces of these transition metals present, i.e., the level of these transition metals should be less than 0.2 weight-%, based on the weight of the entire alumina-containing material (before impregnation with Ti and Mo). It is within the scope of this invention (yet presently not preferred) to employ mixtures of alumina with other inorganic refractory materials such as silica, aluminosilicates (e.g, such as zeolites), magnesia, titania, zirconia, aluminum phosphate, zirconium phosphate, alumia-silica, alumina-titania, zeolite-alumina, zeolite-silica and the like. Generally the above-mentioned refractory materials will not exceed about 3 weight-%, based on the weight of the alumina-containing support material.

Any suitable titanium compound can be employed in steps (A) and (I), as long as it is at least partially soluble in water. Non-limiting examples of suitable titanium compounds are: $TiCl_4$, $TiCl_3$, $TiBr_4$, $TiBr_3$, $TiOCl_2$, $TiOBr_2$, $Ti(NO_3)_4$, $TiO(NO_3)_2$, $Ti(NO_3)_3$, $Ti(SO_4)_2$, $TiOSO_4$, titanium carboxylates such as Ti(IV) oxalate, Ti(IV) citrate, and the like, and mixtures thereof. It is understood that these titanium compounds may exist in hydrated form. The presently preferred titanium compound is titanium (IV) citrate which can be prepared by reaction of a titanium alkoxide such as $Ti(OC_4H_9)_4$ and an aqueous solution of citric acid.

Any suitable molybdenum compound can be employed in steps (C) and (I) as long as it is at least partially soluble in water. Non-limiting examples of suitable molybdenum compounds are: molybdenum halides such as $MoCl_5$ and $MoF_6$, molybdenum oxyhalides such as $MoOCl_3$ and $MoOF_4$, molybdenum oxysulfates, molybdenum oxides and hydroxides, molybdenum blue, molybdic acids, ammonium and alkali metal orthomolybdates, ammonium and alkali metal dimolybdates, ammonium and alkali metal heptamolybdates, ammonium and alkali metal isomolybdates, phosphomolybdic acid and ammonium salts thereof. It is understood that the molybdenum compounds may exist in hydrated form. The presently preferred molybdenum compound is ammonium molybdate.

Even though it is preferred to employ substantially clear aqueous solutions in steps (A), (C) and (I), it is within the scope of this invention to use aqueous solutions having solid particles dispersed therein. In this case, the solutions plus dispersed particles can be used "as is" in steps (A), (C) and (I) or, preferably, the dispersed solid particles are separated from the solutions by any suitable separation means such as filtration, centrifugation or settling and subsequent draining, before the solutions are used for the impregnation of alumina.

It is also within the scope of this invention to have at least one aluminum compounds present in any of the solution employed in steps (A), (C) and (I) so as to enhance the catalytic activity of the calcined compositions of matter. Any suitable aluminum compound can be employed (as an optional agent) in steps (A), (C) and (I) as long as they are at least partially soluble in the solvent used, preferably water. Non-limiting examples of suitable aluminum compounds are: $AlF_3$, $AlCl_3$, $Al(NO_3)_3$, $Al_2(SO_4)_3$, $Al(OH)SO_4$, $Al(ClO_3)_3$, $Al(ClO_4)_3$, aluminum carboxylates such as $Al(CH_3CO_2)_3$ and aluminum alkoxides such as $Al(OCH_3)_3$. It is understood that these compounds may contain water and may thus consist in hydrated form. Presently preferred is $Al(NO_3)_3$, more preferably as hydrate.

The approximate concentration, expressed in gram-atomic weights (herein referred to as mole) per liter of solution, of the compounds of titanium molybdenum and, optionally, aluminum in the impregnating solutions used in steps (A), (C) and (I) are as follows:

|  | Broad | Intermediate | Narrow |
|---|---|---|---|
| Step (A): |  |  |  |
| Mole/l Ti | 0.01–4.0 | 0.02–3.0 | 0.05–1.0 |
| Mole/l Al | 0–4.0 | 0–3.0 | 0–1.5 |
| Step (C): |  |  |  |
| Mole/l Mo | 0.005–2.0 | 0.01–1.0 | 0.02–0.5 |
| Mole/l AL | 0–4.0 | 0–3.0 | 0–1.5 |
| Step (I): |  |  |  |
| Mole/l Ti | 0.01–4.0 | 0.02–3.0 | 0.05–1.0 |
| Mole/l Mo | 0.005–2.0 | 0.01–1.0 | 0.02–0.5 |
| Mole/l Al | 0–4.0 | 0–3.0 | 0–1.5 |

It is within the scope of this invention, even though presently not preferred, to have additional transition metal compounds present in each of the impregnating solutions described above. Examples of these additional transition metal compounds are those of Zr, V, W, Mn, Co, Ni, Cu and the like. Also phosphorus compounds (e.g., phosphates, phosphites) may be present in each of the above solutions. If these additional transition metal compounds and phosphorus compounds are present, their concentrations are generally small, i.e., less than those of compounds of Ti and Mo. At present, it is preferred that these additional transition metal and phosphorus compounds are substantially absent in the impregnating solutions.

The drying steps (B), (D) and (II) are generally carried out in air or an inert gas, at a temperature ranging from about 20° C. to about 200° C. (preferably 50°–120° C.) so as to remove the greatest portion of water from the mixture obtained in the preceding step. Vacuum conditions may be employed but are presently not preferred. The at least partially dried mixture generally contains less that about 20 weight-% water. The rate of drying is controlled so as to avoid surges of water vapor that can cause the impregnating solution to splatter and to excessively accumulate in certain surface regions of the solid support material. Depending on the drying temperature and specific drying conditions (such as extent of air movement; thickness of the solid layer to be dried), the drying time ranges generally from about 0.5 hour to about 100 hours, preferably from about 1 hour to about 30 hours.

The preferred heating (calcining) conditions in steps (E) and (III) comprises heating in a non-reducing gas atmosphere, a temperature ranging from about 200° C. to about 800° C. (more preferably from about 300° C. to about 600° C.) and a heating time ranging from 1 to about 10 hours. A presently preferred specific calcining program is described in Example I. Generally the heating is carried out in a free oxygen containing atmosphere, preferably air. But other non-reducing gases, e.g., nitrogen, helium, neon, argon, krypton, xenon or mixtures thereof, may also be employed.

It is presently believed that the activation occuring in calcining steps (E) and (III) is the result of an at least partial conversion of the compounds of titanium, molybdenum and, optionally, aluminum to oxidic compounds of these metals (preferably $TiO_2$, $MoO_3$ and, optionally, $Al_2O_3$). The terms "activate" and "activation" as used herein means that the calcined catalyst composition of this invention is a more effective catalyst for hydrotreating reactions, particularly hydrodemetallization and hydrodesulfurization of liquid hydrocarbon-containing feed streams, than the at least partially dried mixture obtained in preceding steps (D) and (II), respectively.

In an optional embodiment, a calcining step (B') (at the above-described calcining conditions) is performed after step (B) and before step (C). At present, calcining step (B') is not considered a preferred feature of this invention.

The calcined compositions of matter of this invention obtained in steps (E) and (III), respectively, generally contain from about 0.1 to about 10 weight-% Ti, preferably from about 0.5 to about 5 weight-% Ti, based on the entire composition of matter; and generally contain from about 0.1 to about 10 weight-% Mo, preferably from about 0.3 to about 3 weight-%, based on the entire composition of matter.

The surface area (determined by the BET/$N_2$ method; ASTM D3037) of the calcined catalyst compositions of matter of this invention generally is in the range of from about 20 to about 350 m²/g, preferably in the range of from about 100 to about 250 m²/g. The pore volume (determined by mercury intrusion using an Autopore 9200 instrument of Micromeretics, Nocross, Ga.), generally is in the range of from about 0.2 to about 2.0 cc/g. The compositions of matter of this invention can be pelletized or compacted into various shapes (e.g., spherical, cylindrical or trilobal) for convenient shipping and use in fixed catalyst beds.

In one embodiment, the compositions of matter (catalyst composition) of this invention (from steps (E) and (III), respectively) are presulfied by the additional steps (F) and (IV), respectively, by contacting the calcined compositions of matter with at least one suitable sulfur compound under such conditions as to at least partially convert molybdenum compounds contained in the calcined catalyst composition to molybdenum sulfide. This can be accomplished by passing a sulfur-containing gas oil or a solution of COS or mercaptans or organic sulfides, e.g., in a hydrocarbon solvent, over the catalyst composition at an elevated temperature (e.g., at 300°–650° F.), generally in the presence of hydrogen gas. Or a gaseous mixture of hydrogen and hydrogen sulfide (e.g., at a volume ratio of about 10:1) can be passed over the catalyst composition at an elevated temperature, preferably 1–15 hours at about 400° F. and then 1–15 hours at about 700° F. This presulfiding step is particularly desirable when the catalyst composition of this invention is used for hydrotreating or hydrocracking of liquid hydrocarbon containing feed streams.

The composition of matter of this invention can be used as a catalyst composition for a variety of reactions such as hydrocarbon conversion reactions. In one preferred embodiment of this invention, the catalyst composition of this invention is used as a catalyst for hydrotreating substantially liquid hydrocarbon-containing feed streams, which also contain compounds of sulfur, nickel and vanadium as impurities, and generally also asphaltenes, coke precursors (measured as Ramsbottom carbon residue) and nitrogen compounds. Suitable hydrocarbon containing feed streams include crude oil and fraction thereof, petroleum products, heavy oil extracts, coal pyrolyzates, liquefied coal products, products from tar sands, shale oil and shale oil products. The catalyst compositions are particularly suited for treating heavy topped crudes and heavy oil residua, which generally has an initial boiling point in excess of about 400° F., preferably in excess of about 600° F., containing about 5–1000 ppmw (parts per million by weight) of vanadium, about 3–500 ppmw of nickel, about 0.3–5 weight-% sulfur, about 0.2–2 weight-% nitrogen, and having an $API^{60}$ gravity of about 5–25.

The hydrotreating process of this invention employing the catalyst composition of this invention is carried out in any apparatus whereby an intimate contact of the catalyst composition with said hydrocarbon-containing feed stream and a free hydrogen containing gas is achieved, under such conditions as to produce a hydrocarbon-containing product having a reduced level of nickel, vanadium and sulfur. Generally, a lower level of nitrogen and Ramsbottom carbon residue and a higher value of $API^{60}$ gravity are also attained in this hydrotreating process. The hydrotreating process can be carried out using a fixed catalyst bed (presently preferred) or a fluidized catalyst bed or a moving catalyst bed or an agitated slurry of the catalyst in the oil feed (hydrovisbreaking operation). The hydrotreating process can be carried out as a batch process or, preferably, as a continous process, more preferably in a tubular reactor containing one or more fixed catalyst beds or in a plurality of fixed bed reactors in parallel or in series.

The catalyst composition of this invention can be used in said hydrotreating process alone in a reactor or may be used in combination with essentially unpromoted refractory materials such as alumina, silica, titania, magnesia, silicates, metal aluminates, alumino-silicates (e.g., zeolites), titania and metal phosphates. Alternating layers of the refractory material and of the catalyst composition can be used, or the catalyst composition can be mixed with the refractory material. Use of the refractory material with the catalyst composition provides for better dispersion of the hydrocarbon-containing feed stream. Also, other catalysts such as known hydrogenation and desulfurization catalysts (e.g., $NiO/MoO_3$, $CoO/MoO_3$ and $NiO/CoO/MoO_3$ on alumina) may be used with the catalyst composition of this invention to achieve simultaneous demetallization, desulfurization, denitrogenation, hydrogenation and hydrocracking, if desired. In one embodiment of said hydrocarbon hydrotreating process, the catalyst composition has been presulfided, as described above, before being used.

Any suitable reaction time between the catalyst composition, the hydrocarbon containing feed stream and hydrogen gas can be utilized. In general, the reaction time will range from about 0.05 hours to about 10 hours. Preferably, the reaction time will range from about 0.4 to about 5 hours. Thus, the flow rate of the hydrocarbon-containing feed stream should be such that the time required for the passage of the mixture through the reactor (residence time) will preferably be in the range of about 0.4 to about 5 hours. In a continuous fixed bed operation, this generally requires a liquid hourly space velocity (LHSV) in the range of about 0.10 to about 20 cc of feed per cc of catalyst per hour, preferably from about 0.2 to about 2.5 cc/cc/hr.

The hydrotreating process employing the catalyst composition of the present invention can be carried out at any suitable temperature. The temperature will generally be in the range of about 250° C. to about 550° C. and will preferably be in the range of about 350° C. to about 450° C. Higher temperatures do improve the removal of metals, but temperatures which will have adverse effects on the hydrocarbon containing feed stream, such as excessive coking, will usually be avoided. Also, economic considerations will usually be taken into account in selecting the operating temperature. Lower temperatures can generally be used for lighter feeds.

Any suitable pressure may be utilized in the hydrotreating process of this invention. The reaction pressure will generally be in the range of about atmospheric pressure (0 psig) to up to about 5,000 psig. Preferably, the pressure will be in the range of about 100 to about 2500 psig. Higher pressures tend to reduce coke formation but operating at high pressure may be undesirable for safety and economic reasons.

Any suitable quantity of hydrogen can be added to the hydrotreating process. The quantity of hydrogen used to contact the hydrocarbon containing feed stock will generally be in the range of about 100 to about 10,000 standard cubic feet $H_2$ per barrel of the hydrocarbon containing feed stream and will more preferably be in the range of about 1000 to about 6000 standard cubic feet $H_2$ per barrel of the hydrocarbon containing feed stream.

In general, the catalyst composition is utilized primarily for demetallization until a satisfactory level of metals (Ni, V) removal is no longer achieved. Catalyst deactivation generally results from the coating of the catalyst composition with coke and metals removed from the feed. It is possible to remove the metals from the catalyst. But it is generally contemplated that once the removal of metals falls below a desired level, the spent (deactivated) catalyst will simply be replaced by fresh catalyst.

The time in which the catalyst composition of this invention will maintain its activity for removal of metals and sulfur will depend upon the metals concentration in the hydrocarbon containing feed streams being treated. Generally the catalysts composition can be used for a period of time long enough to accumulate about 20–200 wt. % of metals, mostly Ni and V, based on the initial weight of the catalyst composition, from the hydrocarbon containing feed. In other words, the weight of the spent catalyst composition will be about 20–200% higher than the weight of the fresh catalyst composition.

Generally, at least a portion of the hydrotreated product stream having reduced metal and sulfur contents is subsequently cracked in a cracking reactor, e.g. in a fluidized catalytic cracking unit, under such conditions as to produce lower boiling hydrocarbon materials (i.e., having a lower boiling range at 1 atm. than the feed hydrocarbons) suitable for use as gasoline, diesel fuel, lubricating oils and other useful products. It is within the scope of this invention to hydrotreat said product stream having reduced metal and sulfur contents in one or more processes using different catalyst compositions, such as alumina-supported $NiO/MoO_3$ or $CoO/MoO_3$ catalysts, for further removal of sulfur and other impurities, before the product stream is introduced into the cracking reactor.

A further embodiment of this invention is a hydrofining process comprising the step of introducing at least one decomposable metal compound into the hydrocarbon containing feed stream prior to its being contacted with the catalyst composition of this invention. The metal in the decomposable metal compound is selected from the group consisting of the metals of Group IV-B, Group V-B, Group VI-B, Group VII-B, Group VIII and IB of the Periodic Table of Elements (as defined in "College Chemistry" by W. H. Nebergall et al, D. C. Heath and Company, 1972). Preferred metals are molybdenum, tungsten, manganese, chromium, zirconium and copper. Molybdenum is a particularly preferred metal which may be introduced as a carbonyl, acetylacetonate, carboxylate having 1–12 C. atoms per molecule (e.g., acetate, octoate, oxalate), naphthenate, mercaptide, dithiophosphate or dithiocarbamate. Molybdenum hexacarbonyl, molybdenum dithiophosphate and molybdenum dithiocarbamate are particularly preferred additives. The life of the catalyst composition and the efficiency of the demetallization process is improved by introducing at least one of the above-cited decomposable metal compounds into the hydrocarbon-containing feed, which also contains metals such as nickel and vandium. These additives can be added continuously or intermittently and are preferably added at a time when the catalyst composition of this invention has been partially deactivated so as to extend its life.

Any suitable concentration of these additives may be added to the hydrocarbon-containing feed stream. In general, a sufficient quantity of the additive will be added to the hydrocarbon-containing feed stream to result in a concentration of the metal (preferably molybdenum) in said decomposable compounds ranging from about 1 to about 1000 parts per million and more preferably in the range of about 5 to about 100 parts per million in the feed stream.

The following examples are presented in further illustration of the invention and are not to be considered as unduly limiting the scope of this invention.

EXAMPLE I

This example illustrates the preparation of several alumina-supported, titanium and molybdenum-containing hydrofining catalysts prepared by different methods.

Catalyst A (Invention):

This catalyst was prepared by impregnating of alumina first with an aqueous Ti solution and then with an aqueous Mo solution, drying and calcining. Catalyst A contained 1 weight-% Ti and 1 weight-% Mo.

A first solution was prepared by dissolving 31.0 grams of citric acid monohydrate in 60 cc $H_2O$ and then slowly adding 29.8 grams of titanium tetra-n-butoxide ($Ti(C_4H_9O)_4$; provided by Alfa Products, Danvers, MA), with rapid stirring. The solution was heated until it appeared clear, diluted with additional 60 cc of $H_2O$ and boiled for about 20 minutes. The final solution weighed 112.28 grams and contained 0.088 mole (g-atomic weight) of Ti.

7.06 grams of this first solution was diluted with water to give 24 cc of solution, which was thoroughly mixed with 26.0 grams of alumina (provided by American Cyanamid Company, Wayne, NJ, product designation: SN 5982, and having a $BET/N_2$ surface area of about 171 $m^2/gm$) in an evaporating dish. After standing in the open evaporating dish at room temperature (about 70° F.) for about 1 hour, the mixture was dried by exposure to a 250W heating lamp (located about 18" above the open evaporating dish) for several hours. The dried mixture was then placed in a quartz tube and calcined in a stream of 0.5 SCF (standard cubic foot) of air per hour according to the following schedule: 100°→400° F. within 0.5 hours, 400° F. for 2 hours, 400°→500° F. within 0.5 hour, 500° F. for 1 hour, 500°→800° F. within 0.5 hour, 800° F. for 3 hours, 800° F.→room temperature within about 2 hours.

The above calcined composition containing about 1 weight-% Ti was then impregnated (mixed) with a second aqueous solution containing 0.49 grams of $(NH_4)_6Mo_7O_{24}.4H_2O$ (provided by Mallinckrodt, Inc., St. Louis, Mo.; Lot KMTZ) in 24 cc of solution. The mixing, drying and calcining procedures were essentially the same as described above for the impregnation of alumina with the Ti compound.

Catalyst B (Invention):

This catalyst contained 1 weight-% Ti and 1 weight-% Mo and was prepared by impregnating alumina with an aqueous solution containing both Ti and Mo, drying and calcining.

An Aqueous impregnating solution was prepared by adding 0.49 grams of $(NH_4)_6Mo_7O_{24}.4H_2O$ to 7.06 grams of the above-described first solution (containing Ti) that had been diluted with water to give 24 cc (see under Catalyst A).

This combined, Ti Mo-containing solution was thoroughly mixed with 26.0 grams of alumina (provided by Cyanamid Company), dried and calcined essentially in accordance with the procedure described for Catalyst A.

Catalyst C (Control):

This catalyst contained 1 weight-% Mo and 1 weight-% Ti and was prepared by first impregnating alumina with an aqueous Mo solution and then with an aqueous Ti solution (reverse order as for Catalyst A), drying and calcining.

26.0 grams of alumina provided by American Cyanamid Company were thoroughly mixed with 24 cc of an aqueous solution containing 0.49 grams of $(NH_4)_6Mo_7O_{24}.4H_2O$. This mixture was dried and calcined essentially in accordance with the procedure described for Catalyst A. The calcined, Mo-impregnated alumina was then mixed with 24 cc of a Ti-containing solution, prepared by deluting 7.06 grams of the first solution (see under Catalyst A). The thus formed mixture was dried and calcined essentially in accordance with the procedure outlined for Catalyst A.

Catalyst D (Invention):

This invention catalyst was prepared by impregnation of alumina with an aqueous solution containing both Ti and Mo, drying and calcining. It was quite similar to Catalyst B, except that Catalyst D contained 2 weight-% Ti and a different alumina was used.

31.0 grams of anhydrous citric acid were dissolved in 60 cc of water. Then 29.82 grams of $Ti(C_4H_9O)_4$ (titanium tetra-n-butoxide) were slowly added with stirring. The obtained solution was stirred for several minutes and heated to 50° C. The heated solution was allowed to sit, and a formed top layer of butyl alcohol was removed. Then enough water was added to increase the volume of the solution to 150 cc. This diluted solution was heated until it became clear. After this diluted solution had been cooled to room temperature, 3.86 grams of $(NH_4)_6Mo_7O_{24}.4H_2O$ were added with stirring. This clear solution (containing Ti and Mo compounds) was diluted with water to a total volume of 193 cc.

29 cc of the above diluted solution (containing Mo and Ti compounds) was diluted with more water to a volume of 34 cc and mixed with 30.0 grams of alumina provided by Ketjen Catalyst Division of Akzona, Inc. (Pasadena, Tx. having a $BET/N_2$ surface area of 159 $m^2/g$ and a pore volume (by mercury porosimetry) of 1.03 cc/g. This mixture was dried and calcined in accordance with the procedure described under Catalyst A.

Catalyst E (Control):

Catalyst E contained 2 weight-% Ti and 1 weight-% Mo and was prepared by impregnating alumina with a solution of Ti and Mo compounds in an organic solvent, drying and calcining.

3.94 grams of molybdenum octoate (with 8 weight-% Mo; provided by Shepherd Chemical Company, Cincinnati, OH. and 4.47 grams of titanium tetra-n-butoxide were combined in a 50 cc cylinder and diluted with n-propanol (containing 0.2% $H_2O$) to 34 cc.

This solution was thoroughly mixed with alumina provided by Ketjen (see under Catalyst D), and then dried and calcined in accordance with the procedure described under Catalyst A.

Catalyst F (Relating to Invention):

The catalyst was alumina impregnated with about 2 weight-% Al. Catalyst F was prepared as follows. 24.0 grams of alumina (provided by Ketjen, see under Catalyst D) were thoroughly mixed with 27 cc of an aqueous solution containing 6.94 grams of $Al(NO_3)_3.9H_2O$. The mixture was dried and calcined, essentially in accordance with that described under Catalyst A.

EXAMPLE II

In this example, the automated experimental setup for investigating the hydrofining of heavy oils in accordance with the present invention is described. Oil was pumped downward through an induction tube into a trickle bed reactor, 28.5 inches long and 0.75 inches in diameter. The oil pump used was a reciprocating pump with a diaphragm-sealed head. The oil induction tube extended into a catalyst bed (located about 3.5 inches below the reactor top) comprising a top layer of about 40 cc of low surface area α-alumina (14 mesh Alundum; surface area less than 1 $m^2/gram$), a middle layer of 15 cc (6.30 g) of one of the hydrofining catalyst described in Example I mixed with 85 cc of 36 mesh Alundum, and a bottom layer of about 30 cc of α-alumina.

The oil feed was a heavy oil that had been fractionated in a commercial unit of a refinery of Phillips Petroleum Company. The feed contained about 1.7 weight-% sulfur, 16 ppmw (parts per million by weight) nickel, 32 ppmw vandium, and had a specific gravity of 0.97.

Hydrogen was introduced into the reactor through a tube that concentrically surrounded the oil induction tube but extended only to the reactor top. The reactor was heated with a 3-zone furnace. The reactor temperature was measured in the catalyst bed at three different locations by three separate thermocouples embedded in axial thermocouple well (0.25 inch outer diameter). The liquid product oil was generally collected every day for analysis. The hydrogen gas was vented. Vanadium and nickel contents were determined by plasma emission analysis and the sulfur content was measured by X-ray fluorescence spectrometry.

EXAMPLE III

This example illustrates the removal of metals (Ni, V) and sulfur from a heavy oil feed by hydrotreatment in the presence of Catalysts A–D. Pertinent process conditions were: LHSV of about 3.3 cc oil/cc catalyst/hr, hydrogen flow rate of about 2500 per cubic feet $H_2$ per barrel oil; reaction pressure of about 2250 psig; and reaction temperature of about 690° F. Pertinent test conditions and test results are summarized in Tables I and II. %-removal of Ni+V and %-removal S were corrected for variations in flow rate based on first order kinetics so as to give results one would have obtained at 3.3 LHSV.

TABLE I

| Run | Catalyst | Days on Stream | Flow Rate (LHSV) | % Removal of S | % Removal of (Ni + V) |
|---|---|---|---|---|---|
| 1 (Invention) | A | 1 | 3.32 | 16.0 | 17.7 |
| | | 2 | 3.13 | 12.4 | 14.3 |
| | | 3 | 3.33 | 20.9 | 27.4 |
| | | 4 | 3.33 | 16.7 | 23.4 |
| | | 5 | 3.33 | 17.3 | 22.4 |
| | | 8 | 3.10 | 9.5 | 12.8 |
| | | 9 | 3.39 | 10.3 | 16.1 |
| | | 10 | 3.06 | 0[1] | 13.3 |
| | | 11 | 2.89 | 7.8 | 14.8 |
| | | 12 | 2.96 | 8.6 | 13.8 |
| | | Average[2]: | | 13.3 | 17.6 |
| 2 (Invention) | B | 1 | 4.02 | 22.8 | 19.8 |
| | | 2 | 3.40 | 16.4 | 20.6 |
| | | 3 | 3.53 | 11.3 | 13.9 |
| | | 4 | 3.40 | 13.3 | 14.9 |
| | | 5 | 3.15 | 11.9 | 16.5 |
| | | 6 | 3.71 | 9.8 | 11.9 |
| | | 7 | 3.71 | 9.8 | 14.1 |
| | | 8 | 3.23 | 7.5 | 12.7 |
| | | 9 | 3.18 | 15.5 | 7.1 |
| | | 10 | 3.31 | 0[1] | 7.2 |
| | | 11 | 3.11 | 14.0 | 13.0 |
| | | Average[2]: | | 13.2 | 13.8 |
| 3 (Control) | C | 1 | 3.71 | 11.1 | 8.5 |
| | | 2 | 3.55 | 16.4 | 13.9 |
| | | 3 | 3.48 | 18.5 | 15.0 |
| | | 4 | 3.27 | 16.4 | 13.5 |

TABLE I-continued

| Run | Catalyst | Days on Stream | Flow Rate (LHSV) | % Removal of S | (Ni + V) |
|---|---|---|---|---|---|
| | | 5 | 3.33 | 13.7 | 18.7 |
| | | 7 | 3.45 | 9.8 | 12.8 |
| | | 8 | 3.53 | 11.3 | 11.7 |
| | | 9 | 3.61 | 8.3 | 12.5 |
| | | 10 | 3.53 | 9.4 | 11.0 |
| | | 11 | 3.32 | 5.3 | 12.0 |
| | | 12 | 3.15 | 0[1] | 9.5 |
| | | Average[2]: | | 12.0 | 12.6 |

[1]Result believed to be erroneous.
[2]Data that are believed to be erroneous were not used for the calculation of Average.

Data in Table I clearly show that the removal of Ni+V and of S was greater when invention Catalyst A (prepared by impregnation of Cyanamid's $Al_2O_3$ first with Ti and then with Mo) and Catalyst B (prepared with Mo) were employed, as compared with Control Catalyst C (prepared by impregnation of Cyanamid's $Al_2O_3$ first with Mo and then with Ti). The promoter level on the three catalysts in Table I was the same, namely 1 weight-% Ti and 1 weight-% Mo.

TABLE II

| Run | Catalyst | Days on Stream | Flow Rate (LHSV) | % Removal of S | (Ni + V) |
|---|---|---|---|---|---|
| 4 (Invention) | D | 2 | 3.46 | 34.8 | 28.9 |
| | | 3 | 3.25 | 4.1 | 23.4 |
| | | 4 | 3.33 | 20.3 | 28.0 |
| | | 5 | 3.01 | 16.2 | 23.5 |
| | | 6 | 3.11 | 15.2 | 22.9 |
| | | 7 | 2.94 | 17.2 | 23.3 |
| | | 8 | 3.29 | 7.1 | 12.7 |
| | | 9 | 3.15 | 7.0 | 17.7 |
| | | 10 | 3.41 | 13.4 | 23.9 |
| | | 11 | 3.40 | 8.5 | 19.6 |
| | | 12 | 3.25 | 2.9 | 18.8 |
| | | 13 | 3.11 | 5.6 | 20.8 |
| | | 14 | 3.34 | 28.6 | 27.0 |
| | | 15 | 3.11 | 12.9 | 22.7 |
| | | 16 | 3.09 | 10.0 | 19.2 |
| | | 17 | 3.27 | 13.5 | 24.5 |
| | | Average: | | 13.6 | 22.3 |
| 5 (Control) | E | 5 | 3.17 | 14.8 | 22.9 |
| | | 6 | 3.26 | 13.4 | 15.6 |
| | | 7 | 3.29 | —[1] | 15.5 |
| | | 8 | 3.29 | 8.2 | 10.0 |
| | | 10 | 3.78 | 14.6 | 13.7 |
| | | 11 | 3.34 | 12.5 | 17.8 |
| | | 12 | 3.35 | 16.7 | 17.8 |
| | | 13 | 3.44 | 18.3 | 23.9 |
| | | 14 | 3.33 | 14.3 | 19.6 |
| | | 15 | 3.33 | 11.3 | 21.0 |
| | | 16 | 3.61 | 0[1] | 8.7 |
| | | 17 | 3.69 | 5.9 | 16.5 |
| | | Average[2]: | | 13.0 | 16.9 |

[1]Result believed to be erroneous.
[2]Data that are believed to be erroneous were not used for the calculation of Average.

Data in Table II clearly show that invention Catalyst D (prepared by impregnation of Ketjen's $Al_2O_3$ with an aqueous solution of Ti and Mo) was more effective in removing S and (Ni+V) than Control Catalyst E (prepared by impregnation of Ketjen's $Al_2O_3$ with an organic (alcoholic) solution of Ti and Mo). The promoter level on both catalysts was the same, namely 2 weight-% Ti and 1 weight-% Mo.

EXAMPLE IV

This example describes the removal of S and metals (Ni+V) from a heavy topped crude oil (Maya 400° F.+) containing 4.0 weight-% S, about 62 ppmw Ni and 302 ppmw V, substantially in accordance with the procedure described in Example II. Pertinent process conditions and test results are summarized in Table III. The %-removal of S and (Ni+V) was corrected for variations in hour rate based on first order kinetics so as to give results one would obtain for LHSV of 1.00.

TABLE III

| Run | Catalyst | Hours on Stream | Temp. (°F.) | Flow Rate (LHSV) | % Removal of S | (Ni + V) |
|---|---|---|---|---|---|---|
| 6 | $Al_2O_3$ (Ketjen) | 88 | 750 | 1.00 | 10.7 | 16.8 |
| | | 104 | " | 1.00 | 20.1 | 44.2 |
| | | 129 | " | 1.00 | 9.3 | 29.4 |
| | | 153 | " | 0.95 | 16.1 | 46.7 |
| | | 173 | " | 0.91 | 16.7 | 48.9 |
| | | 197 | " | 0.93 | 4.2 | 53.5 |
| | | 223 | " | 1.00 | 20.3 | 59.0 |
| | | 249 | " | 0.93 | 18.9 | 57.6 |
| | | 274 | " | 0.93 | 22.3 | 60.1 |
| | | 299 | " | 0.93 | 24.3 | 59.9 |
| | | 326 | " | 0.93 | 24.6 | 61.4 |
| | | Average: | | | 17.0 | 48.9 |
| 7 | F | 57 | 750 | 0.92 | 13.1 | 32.0 |
| | | 90 | " | 0.97 | 14.0 | 42.4 |
| | | 138 | " | 1.03 | 17.4 | 49.5 |
| | | 162 | " | 1.01 | 24.1 | 57.0 |
| | | 186 | " | 0.99 | 18.0 | 56.5 |
| | | 210 | " | 1.00 | 25.0 | 59.6 |
| | | 234 | " | 0.96 | 27.1 | 60.2 |
| | | 258 | " | 1.01 | 19.8 | 60.4 |
| | | 282 | " | 0.98 | 27.7 | 63.8 |
| | | Average: | | | 20.7 | 53.5 |

Data in Table III clearly show that alumina that had been impregnated with an aluminum compound was more active in removing sulfur and metals (Ni, V) than alumina alone (the same as used to prepare Catalyst F). Based on these results, it is concluded that the presence of aluminum compounds in the aqueous impregnating solutions used to prepare invention Catalysts A, B and D would be also result in an enhancement of the desulfurization and demetallization activities of these catalysts.

EXAMPLE V

This example illustrates the effect of the addition of small amounts of a decomposable molydbenum compound, $Mo(CO)_6$, to an undiluted Monagas pipeline oil feed containing about 336 ppm V and about 87 ppm Ni on the removal of these metals in the presence of a commercial hydrofining catalyst containing about 0.9 weight-% CoO, 0.5 weight-% NiO, 7.3 weight-% MoO and about 91 weight-% $Al_2O_3$, having a surface area of about 180 $m^2/g$). LHSV of the feed for both runs ranged from about 1.0 to 1.1 cc/cc catalyst/hr, the temperature was about 765° C. (407° C.), the pressure was about 2250 psig, and the hydrogen feed rate was about 4800 SCF/barrel oil. Experimental data are summarized in Table IV.

TABLE IV

| Days on Stream | PPM Mo in Feed | %- Removal of (Ni + V) | PPM Mo in Feed | %- Removal % (Ni + V) |
|---|---|---|---|---|
| 5 | 0 | 64 | 17 | 72 |
| 12–13 | 0 | 62 | 17 | 71 |
| 17 | 0 | 59 | 7 | 70 |
| 20–21 | 0 | 61 | 7 | 65 |
| 26 | 0 | 58 | 7 | 64 |
| 32–33 | 0 | 53 | 7 | 65 |

TABLE IV-continued

| Days on Stream | PPM Mo in Feed | %- Removal of (Ni + V) | PPM Mo in Feed | %- Removal % (Ni + V) |
| --- | --- | --- | --- | --- |
| 41 | 0 | 52 | 7 | 70 |
| 52–53 | 0 | 41 | 7 | 66 |
| 58–59 | 0 | 43 | 4 | 65 |

Data in Table IV clearly show the beneficial effect of added small amounts of Mo (as Mo(CO)$_6$) to the feed on the demetallization of the oil when a commercial hydrofining catalyst was used. Based on these results, it is presently preferred to introduce a decomposable Mo compound (such as carbonyl, dithiophosphates, dithiocarbamates and the like) into the feed that is hydrotreated with catalyst compositions of this invention.

Reasonable variations and modifications are possible within the scope of the disclosure and the appended claims.

We claim:

1. A process for preparing a composition of matter comprising alumina as support material, at least one compound of titanium, at least one compound of molybdenum and at least one compound of aluminum, said process comprising the steps of:
   (A) impregnating a support material consisting essentially of alumina with a solution comprising water, at least one compound of titanium and at least one compound of aluminum;
   (B) heating the material obtained in step (A) under such conditions as to at least partially dry said material obtained in step (A);
   (C) impregnating the at least partially dried material obtained in step (B) with a solution comprising water and at least one compound of molybdenum;
   (D) heating the material obtained in step (C) at a first temperature so as to at least partially dry said material obtained in step (C);
   (E) heating the at least partially dried material obtained in step (D) at a second temperature, which is higher than said first temperature, so as to activate said at least partially dried material obtained in step (D).

2. A process in accordance with claim 1, wherein the solution used in step (C) additionally contains at least one aluminum compound.

3. A process in accordance with claim 1, wherein said solution used in step (A) contains about 0.01–4.0 mol/l Ti and the solution used in step (C) contains about 0.005–2.0 mol/l Mo.

4. A process in accordance with claim 3, wherein said solution used in step (A) contains 0.02–3.0 mol/l Ti and the solution used in step (C) contains about 0.01–1.0 mol/l Mo.

5. A process in accordance with claim 1, wherein the support material used in step (A) has a surface area in the range of from about 20 to about 350 m$^2$/g.

6. A process in accordance with claim 1, wherein said heating in step (B) is carried out at a temperature in the range of from about 20° to about 200° C., said first temperature in step (D) is in the range of from about 20° to about 200° C., and said second temperature in step (E) is in the range of from about 200° to about 800° C.

7. A process in accordance with claim 1, wherein said heating in step (B) is carried out at a temperature in the range of from about 50° to about 120° C., said first temperature in step (D) is in the range of from about 50° to about 120° C., and said second temperature in step (E) is in the range of from about 300° to about 600° C.

8. A process in accordance with claim 1, comprising the additional step of
   (F) contacting the calcined material obtained in step (E) with at least one suitable sulfur compound under such conditions as to at least partially convert molybdenum compounds contained in said calcined material to molybdenum sulfide.

9. A process in accordance with claim 8, wherein said contacting in step (F) is carried out with a sulfiding agent selected from the group consisting of sulfur-containing gas oil, solution of COS, solutions of mercaptans, solution of organic sulfides, and gaseous mixtures of hydrogen and hydrogen sulfide.

10. A process for preparing a composition of matter comprising alumina, at least one compound of titanium and at least one compound of molybdenum, said process comprising the steps of:
    (I) impregnating a support material consisting essentially of alumina with an aqueous solution comprising at least one compound of titanium and at least one compound of molybdenum;
    (II) heating the material obtained in step (I) at a first temperature so as to at least partially dry said material obtained in step (I);
    (III) heating the at least partially dried material obtained in step (II) at a second temperature, which is higher than said first temperature, so as to activate said at least partially dried material obtained in step (II); and
    (IV) contacting the calcined material obtained in step (III) with at least one suitable sulfur compound under such conditions as to at least partially convert molybdenum compounds contained in said calcined material to molybdenum sulfide.

11. A process in accordance with claim 10, wherein the solution used in step (I) additionally comprises at least one aluminum compound.

12. A process in accordance with claim 10, wherein the solution used in step (I) contains about 0.01–4.0 mol/l Ti and about 0.005–2.0 mol/l Mo.

13. A process in accordance with claim 10, wherein the solution used in step (I) contains about 0.02–3.0 mol/l Ti and about 0.01–1.0 mol/l Mo.

14. A process in accordance with claim 10, wherein the support material used in step (I) has a surface area in the range of from about 20 to about 350 m$^2$/g.

15. A process in accordance with claim 10, wherein said first temperature in step (II) is in the range of from about 20° to about 200° C. and said second temperature in step (III) is in the range of from about 200° to about 800° C.

16. A process in accordance with claim 10, wherein said first temperature in step (II) is in the range of from about 50° to about 120° C., and said second temperature in step (III) is in the range of from about 300° to about 600° C.

17. A process in accordance with claim 10, wherein said contacting in step (IV) is carried out with a sulfiding agent selected from the group consisting of sulfur-containing gas oil, solution of COS, solution of mercaptans, solution of organic sulfides, and gaseous mixtures of hydrogen and hydrogen sulfide.

18. A composition of matter comprising alumina as support material, at least one compound of titanium, at least one compound of molybdenum and at least one compound of aluminum, said composition of matter having been prepared by a process comprising the steps of:
(A) impregnating a support material consisting essentially of alumina with a solution comprising water, at least one compound of titanium and at least one compound of aluminum;
(B) heating the material obtained in step (A) under such conditions as to at least partially dry said material obtained in step (A);
(C) impregnating the at least partially dried material obtained in step (B) with a solution comprising water and at least one compound of molybdenum;
(D) heating the material obtained in step (C) at a first temperature so as to at least partially dry said material obtained in step (C);
(E) heating the at least partially dried material obtained in step (D) at a second temperature, which is higher than said first temperature, so as to activate said at least partially dried material obtained in step (D).

19. A composition of matter in accordance with claim 18, wherein the solution used in step (C) additionally comprises at least one aluminum compound.

20. A composition of matter in accordance with claim 18, wherein the solution used in step (A) contains about 0.01–4.0 mol/l Ti and the solution used in step (C) contains about 0.005–2.0 mol/l Mo.

21. A composition of matter in accordance with claim 18, wherein the solution used in step (A) contains about 0.02–3.0 mol/l Ti and the solution used in step (C) contains about 0.01–1.0 mol/l Mo.

22. A composition of matter in accordance with claim 18, wherein said heating in step (B) is carried out at a temperature in the range of from about 20° to about 200° C., said first temperature in step (D) is in the range of from about 20° to about 200° C., and said second temperature in step (E) is in the range of from about 200° to about 800° C.

23. A composition of matter in accordance with claim 18 containing from about 0.1 to about 10 weight-% Ti and from about 0.1 to about 10 weight-% Mo, both based on the calcined composition of matter obtained in step (E), and having a surface area in the range of from about 20 to about 350 m²/g.

24. A composition of matter in accordance with claim 18 containing from about 0.5 to about 5 weight-% Ti and from about 0.3 to about 3 weight-% Mo, both based on the calcined composition of matter obtained in step (E), and having a surface area in the range of from about 100 to about 250 m²/g.

25. A composition of matter in accordance with claim 18 having been prepared by a process comprising the additional step of
(F) contacting the calcined material obtained in step (E) with at least one suitable sulfur compound under such conditions as to at least partially convert molybdenum compounds contained in said calcined material to molybdenum sulfide.

26. A composition of matter in accordance with claim 25, wherein said contacting in step (F) is carried out with a sulfiding agent selected from the group consisting of sulfur-containing gas oil, solution of COS, solution of mercaptans, solution of organic sulfides, and gaseous mixture of hydrogen and hydrogen sulfide.

27. A composition of matter comprising alumina, at least one compound of titanium and at least one compound of molybdenum, said composition of matter having been prepared by a process comprising the steps of:
(I) impregnating a support material consisting essentially of alumina with an aqueous solution containing at least one compound of titanium and at least one compound of molybdenum;
(II) heating the material obtained in step (I) at a first temperature so as to at least partially dry said material obtained in step (I); (and)
(III) heating the at least partially dried material obtained in step (II) at a second temperature, which is higher than said first temperature, so as to activate said at least partially dried material obtained in step (II); and
(IV) contacting the calcined material obtained in step (III) with a suitable sulfur compound under such conditions as to at least partially convert molybdenum compounds contained in said calcined material to molybdenum sulfide.

28. A composition of matter in accordance with claim 27, wherein the solution used in step (I) additionally comprises at least one aluminum compound.

29. A composition of matter in accordance with claim 27, wherein the solution used in step (I) contains about 0.01–4.0 mol/l Ti and about 0.005–2.0 mol/ Mo.

30. A composition of matter in accordance with claim 27, wherein the solution used in step (I) contains about 0.02–3.0 mol/l Ti and about 0.01–1.0 mol/l Mo.

31. A composition of matter in accordance with claim 27, wherein said first temperature in step (II) is in the range of from about 20° to about 200° C. and said second temperature in step (III) is in the range of from about 200° to about 800° C.

32. A composition of matter in accordance with claim 27 containing from about 0.1 to about 10 weight-% Ti and from about 0.1 to about 10 weight-% Mo, both based on the calcined composition of matter obtained in step (III), and having a surface area in the range of from about 20 to about 350 m²/g.

33. A composition of matter in accordance with claim 27 containing from about 0.5 to about 5 weight-% Ti and from about 0.3 to about 3 weight-% Mo, both based on the calcined composition of matter obtained in step (III), and having a surface area in the range of from about 100 to about 250 m²/g.

34. A composition of matter in accordance with claim 27, wherein said contacting in step (IV) is carried out with a sulfiding agent selected from the group consisting of sulfur-containing gas oil, solution of COS, solution of mercaptans, solution of organic sulfides, and gaseous mixtures of hydrogen and hydrogen sulfide.

35. A process for preparing a composition of matter consisting essentially of alumina, at least one compound of titanium and at least one compound of molybdenum, said process comprising the steps of:
(I) impregnating a support material consisting essentially of alumina with a solution consisting essentially of water, at least one compound of titanium and at least one compound of molybdenum;
(II) heating the material obtained in step (I) at a first temperature so as to at least partially dry said material obtained in step (I); and
(III) heating the at least partially dried material obtained in step (II) at a second temperature, which is higher than said first temperature, so as to activate said at least partially dried material obtained in step (II).

36. A process in accordance with claim 35, wherein the solution used in step (I) contains about 0.01–4.0 mol/l Ti and about 0.005–2.0 mol/l Mo.

37. A process in accordance with claim 35, wherein the solution used in step (I) contains about 0.02–3.0 mol/l Ti and about 0.01–1.0 mol/l Mo.

38. A process in accordance with claim 35, wherein the support material used in step (I) has a surface area in the range of from about 20 to about 350 m$^2$/g.

39. A process in accordance with claim 35, wherein said first temperature in step (II) is in the range of from about 20° to about 200° C. and said second temperature in step (III) is in the range of from about 200° to about 800° C.

40. A process in accordance with claim 35, wherein said first temperature in step (II) is in the range of from about 50° to about 120° C., and said second temperature in step (III) is in the range of from about 300° to about 600° C.

41. A process in accordance with claim 35 further comprising the step of
    (IV) contacting the calcined material obtained in step (III) with at least one suitable sulfur compound under such conditions as to at least partially convert molybdenum compounds contained in said calcined material to molybdenum sulfide.

42. A process in accordance with claim 41, wherein said contacting in step (IV) is carried out with a sulfiding agent selected from the group consisting of sulfur-containing gas oil, solution of COS, solution of mercaptans, solution of organic sulfides, and gaseous mixtures of hydrogen and hydrogen sulfide.

43. A composition of matter consisting essentially of alumina, at least one compound of titanium and at least one compound of molybdenum, said composition of matter having been prepared by a process comprising the steps of
    (I) impregnating a support material consisting essentially of alumina with a solution consisting essentially of water, at least one compound of titanium and at least one compound of molybdenum;
    (II) heating the material obtained in step (I) at a first temperature so as to at least partially dry said material obtained in step (I); and
    (III) heating the at least partially dried material obtained in step (II) at a second temperature, which is higher than said first temperature, so as to activate said at least partially dried material obtained in step (II).

44. A composition in accordance with claim 43, wherein the solution used in step (I) contains about 0.01–4.0 mol/l Ti and about 0.005–2.0 mol/l Mo.

45. A composition in accordance with claim 43, wherein said solution used in step (I) contains about 0.02–3.0 mol/l Ti and about 0.01–1.0 mol/l Mo.

46. A composition in accordance with claim 43, wherein said first temperature in step (II) is in the range of from about 20° to about 200° C. and said second temperature in step (III) is in the range of from about 200° to about 800° C.

47. A composition in accordance with claim 43, wherein said process further comprises the step of
    (IV) contacting the calcined material obtained in step (III) with at least one suitable sulfur compounds under such conditions as to at least partially convert molybdenum compounds contained in said calcined material to molybdenum sulfide.

48. A composition in accordance with claim 47, wherein said contacting in step (IV) is carried out with a sulfiding agent selected from the group consisting of sulfur-containing gas oil, solution of COS, solution of mercaptans, solution of organic sulfides, and gaseous mixtures of hydrogen and hydrogen sulfide.

49. A composition of matter in accordance with claim 43 containing from about 0.1 to about 10 weight-% Ti and from about 0.1 to about 10 weight-% Mo, both based on the calcined composition of matter obtained in step (III), and having a surface area in the range of from about 20 to about 350 m$^2$/g.

50. A composition of matter in accordance with claim 43 containing from about 0.5 to about 5 weight-% Ti and from about 0.3 to about 3 weight-% Mo, both based on the calcined composition of matter obtained in step (III), and having a surface area in the range of from about 100 to about 250 m$^2$/g.

* * * * *